United States Patent
Thiel

(10) Patent No.: US 6,247,575 B1
(45) Date of Patent: Jun. 19, 2001

(54) SAFETY DEVICE FOR SYSTEMS FOR CONVEYING PERSONS

(75) Inventor: Alfred Thiel, Sprockhövel (DE)

(73) Assignee: O & K Rolltreppen GmbH & Co. KG, Hattingen (DE)

( * ) Notice: Subject to any disclaimer, the term of this patent is extended or adjusted under 35 U.S.C. 154(b) by 0 days.

(21) Appl. No.: 09/424,956

(22) PCT Filed: May 20, 1998

(86) PCT No.: PCT/EP98/02978

§ 371 Date: Mar. 28, 2000

§ 102(e) Date: Mar. 28, 2000

(87) PCT Pub. No.: WO98/55387

PCT Pub. Date: Dec. 10, 1998

(30) Foreign Application Priority Data

Jun. 5, 1997 (DE) ............................................. 197 23 897

(51) Int. Cl.[7] .................................................... B66B 21/00
(52) U.S. Cl. ............................................................. 198/330
(58) Field of Search .................................. 198/322, 323, 198/330

(56) References Cited

U.S. PATENT DOCUMENTS

| | | | |
|---|---|---|---|
| 1,695,083 | * 12/1928 | Blackburne | 198/323 |
| 2,259,366 | * 10/1941 | Dunlop | 198/323 |
| 4,231,452 | 11/1980 | Kraft . | |
| 4,340,131 | * 7/1982 | Eriksson | 198/323 |
| 4,588,065 | * 5/1986 | Maiden et al. | 198/323 |
| 4,664,247 | * 5/1987 | Wolf et al. | 198/323 |
| 5,090,551 | * 2/1992 | Yashuhara et al. | 198/323 |
| 5,092,446 | * 3/1992 | Sullivan, Jr. et al. | 198/323 |
| 5,134,571 | * 7/1992 | Falque et al. | 198/323 |
| 5,337,878 | * 8/1994 | Mehlert et al. | 198/323 |
| 5,513,728 | 5/1996 | Alberni et al. . | |
| 5,642,804 | 7/1997 | Kellis . | |
| 5,645,156 | * 7/1997 | Zaharia et al. | 198/323 |

FOREIGN PATENT DOCUMENTS

| | | |
|---|---|---|
| 413349 | 5/1925 | (DE) . |
| 197 23 897 | 12/1998 | (DE) . |
| 2 135 758 | 12/1972 | (FR) . |
| 2 445 467 | 7/1980 | (FR) . |
| WO 98/55387 | 12/1998 | (WO) . |

OTHER PUBLICATIONS

Dr. Lufti Al–Sharif, Das Anhalten/Abremsen von Fahrtreppen und die Gefahr eines Sturzes der Benutzer.In: Report, Jan. 22, 1996, H.6, pp. 34–40.

* cited by examiner

*Primary Examiner*—Douglas Hess
(74) *Attorney, Agent, or Firm*—Venable; Robert Kinberg; Catherine M. Voorhees

(57) ABSTRACT

A safety device is described for a passenger conveyor system, more particularly an escalator or travelator, that includes a main drive shaft (2) mounting return elements (3) for the transport chains (4) of the steps or pallets, a further shaft containing return elements (3) for the handrails (7) and at least one gear (8, 9, 10) connecting the main drive shaft (2) to the shaft. The drive power of at least one drive unit arranged external to the return elements (3) is translatable via a transport device (12) to the main drive shaft (2). The safety device contains at least one flyweight element (18) provided at the gearing end, at least one brake device (22) as well as at least one control device (14) actuating the brake device (22), and at least one movement/rpm sensor (21) provided in the region of the flyweight element (18) and connected to the control (14), device wherein load-independent braking of the main drive shaft (2) is achievable by the brake device (22) on the basis of signals received from the sensor (21).

12 Claims, 3 Drawing Sheets

SAFETY DEVICE FOR SYSTEMS FOR CONVEYING PERSONS

BACKGROUND OF THE INVENTION

The invention relates to a safety device means for a passenger conveyor system, more particularly an escalator or travelator, including a main drive shaft mounting the return elements for the transport chains of the steps or pallets, a further shaft containing the return elements for the handrails as well as at least one gear unit connecting the main drive shaft to the shaft, the drive power of at least one drive unit arranged external to the return elements being translatable via transport means to the main drive shaft.

It is known in general that passenger conveyor systems, such as escalators and travelators having external main drives, make use of safety brakes in the form of sprag brakes, disc brakes or the like in the region of the associated driven elements. Due to lack of a reduction in translation, high flyweight and low rotary speed of the driven elements (approx. 10–20 rpm) in conjunction with a constantly set braking moment corresponding to the level of the load moment anticipated, shock engagement of the brake is often encountered in the case of untoward sudden events such as chain breakage, overspeed and reversal of rotation.

Pertinent safety regulations view a stopping distance of min. 200 mm and max. 1000 mm as being adequate for passenger conveyor systems at a travelling speed of roughly 0.5 m/s. In the prior art, difficulties associated with the braking moment corresponding to the load moment are only encountered in a light load situation, i.e. with only a few passengers on the escalator or travelator, to the effect that the travelator or escalator is abruptly halted after a delay of approx. 50–80 mm due to sudden engagement of the brake, resulting in the passengers risking a fall and possible serious injury. The components too, of the passenger conveyor system risk being severely loaded by this abrupt halt, especially in a light load situation, so that here too considerable damage may result.

Brakes as put to use hitherto with external drives are complicated, expensive and bulky in design.

SUMMARY OF THE INVENTION

The object of the invention is to provide main drive shafts driven via drives external to the return elements with a safety means which is no longer hampered by the prior art disadvantages, which is simple and cost-effective to manufacture and which ensures optimum safety of man and machine.

This object is achieved by

- at least one flyweight element provided at the gearing end,
- at least one sensor provided in the region of the flyweight element,
- at least one brake means arranged external to the flyweight element as well as
- at least one control means actuating the brake means, wherein load-independent braking of the main drive shaft is achievable by the sensor electrically connected to the control means and the control means cooperating hydraulically with the brake means.

At the gearing end, a flyweight element may be provided which is configured substantially lighter than flyweights as employed hitherto, the flyweight element being exclusively provided to compensate for friction factors that as may occur due to moving parts of the passenger conveyor system. This produces a run-down travel of an escalator or travelator longer than the minimum permissible stopping distance, resulting in a softer run-down than that hitherto in prior art. The rpm sensor cooperates electrically with a hydraulic control. The brake means is preferably formed by a multiplate brake. The preferably spring-loaded multiplate brake is set as a rule so that the plate assembly is loaded, i.e. making movement of the main shaft impossible. For the normal ON condition, the plates are vented by the hydraulic control means, i.e. pretensioning the springs, thus resulting in the spring force effectively retensioning the plates should the hydraulic control be down.

The sensor senses the rotary speed of the flyweight element 8 to 15 times a second and signals the result electrically to the control means which then relays this information hydraulically—via a hydraulic accumulator where necessary—to the piston actuating the multiplate brake.

The closed loop, thus created, remains constant until the sensor senses an rpm of the flyweight element in a departure from the prescribed rpm which may happen, e.g. when a chain breaks, since then the speed of the main drive shaft increases due to the lack of a load.

Accordingly, via the control means soft compensation of the pretension of the spring force as a function of the increase in rpm is possible so that load-independent braking can be introduced within the safety margins as stipulated.

Due to the corresponding main drive shaft being braked independent of the load, passengers—irrespective of how many are involved—now experience a gentle deceleration without the risk of falling, as a result of which also the components of the passenger conveyor system involved in such a sudden emergency situation are relieved of stress to a major extent.

In multi-floor systems involving longer travel of the travelators, a plurality of gear units may be put to use, each of which is then also equipped with the safety components comprising a flyweight element, rpm sensor and brake, all of which are actuatable by a single control means.

The gear end accommodating the flyweight element may be sealed off preferably by a cover which is non-rotatively statically sealed to reliably prevent leakage to the environment since no rotary components exist in the region of the seal.

BRIEF DESCRIPTION OF THE DRAWINGS

The subject matter of the invention will now be detailed by way of an example embodiment as shown in the drawing in which.

DETAILED DESCRIPTION OF THE INVENTION

Figure 1:
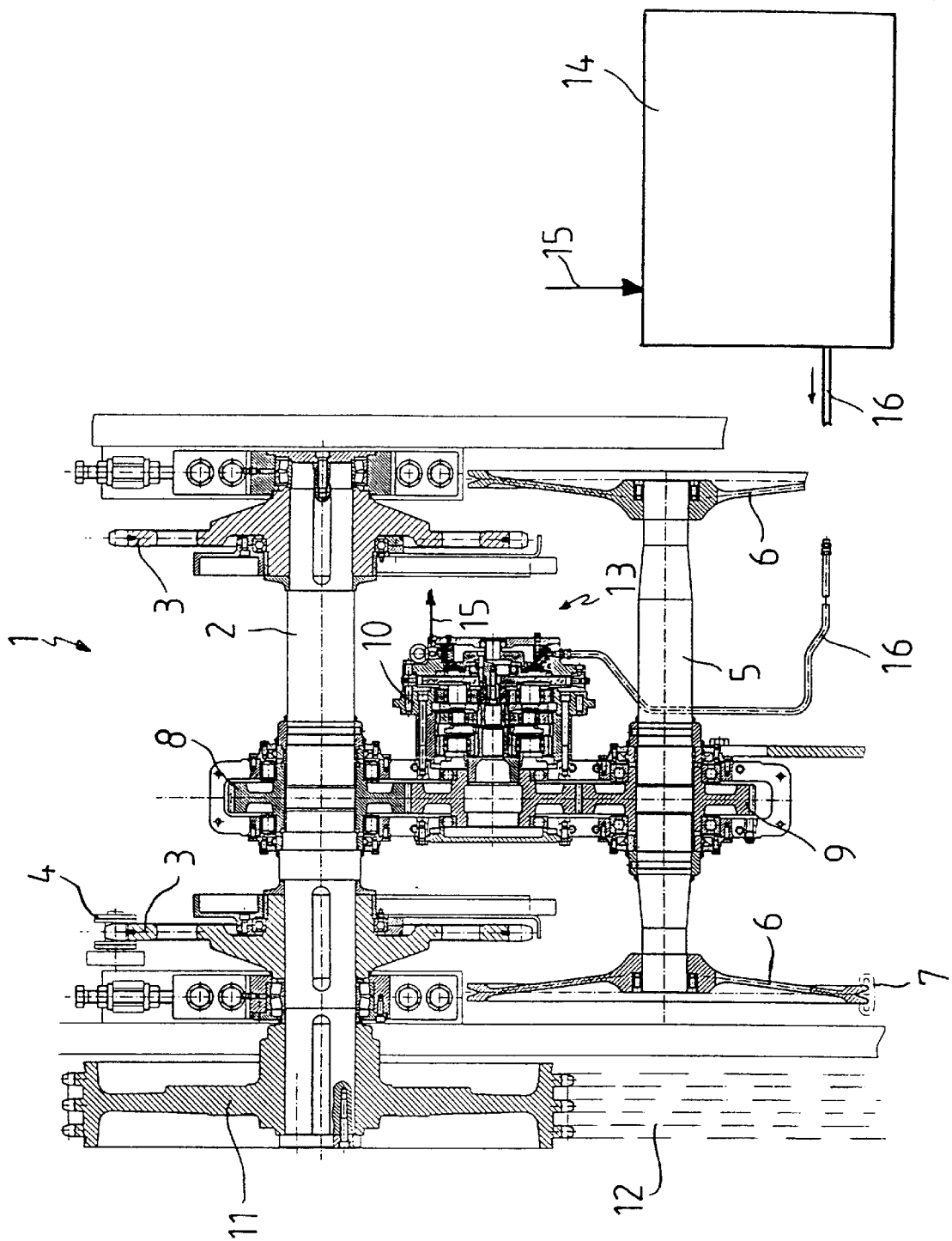
FIG. 1 is a detail of an escalator drive incorporating a safety means for braking the main shaft.

Referring now to FIG. 1 there is illustrated a detail of a drive system 1 for an escalator (not shown). The drive system 1 contains a main drive shaft 2 comprising return elements 3 for a transport chain 4 (indicated only) for the steps (not shown) of the escalator. The drive system 1 contains furthermore a shaft 5 located spaced away from the main drive shaft 2. Mounted on shaft 5 are return 2, the shaft 5 mounting return elements 6 for handrails 7 (likewise indicated only). Provided on both the main drive shaft 2 and on the shaft 5 are gearwheels 8, 9 cooperating with gearing 10 configured in the present example as a multistage planetary gear. The drive power of an escalator drive (not shown) located external to the drive system 1 is transmitted via a sprocket 11 provided on the main drive shaft 2 and a transport means 12 in the form of a transport chain. The safety means 13 (not evident in detail) provided in the region of the planetary gear 10 cooperates with a control means 14 (indicated only) connected, on the one hand, electrically via a cable 15 to the safety means 13 and, on the other, hydraulically via a conduit 16 thereto.

Figure 2:
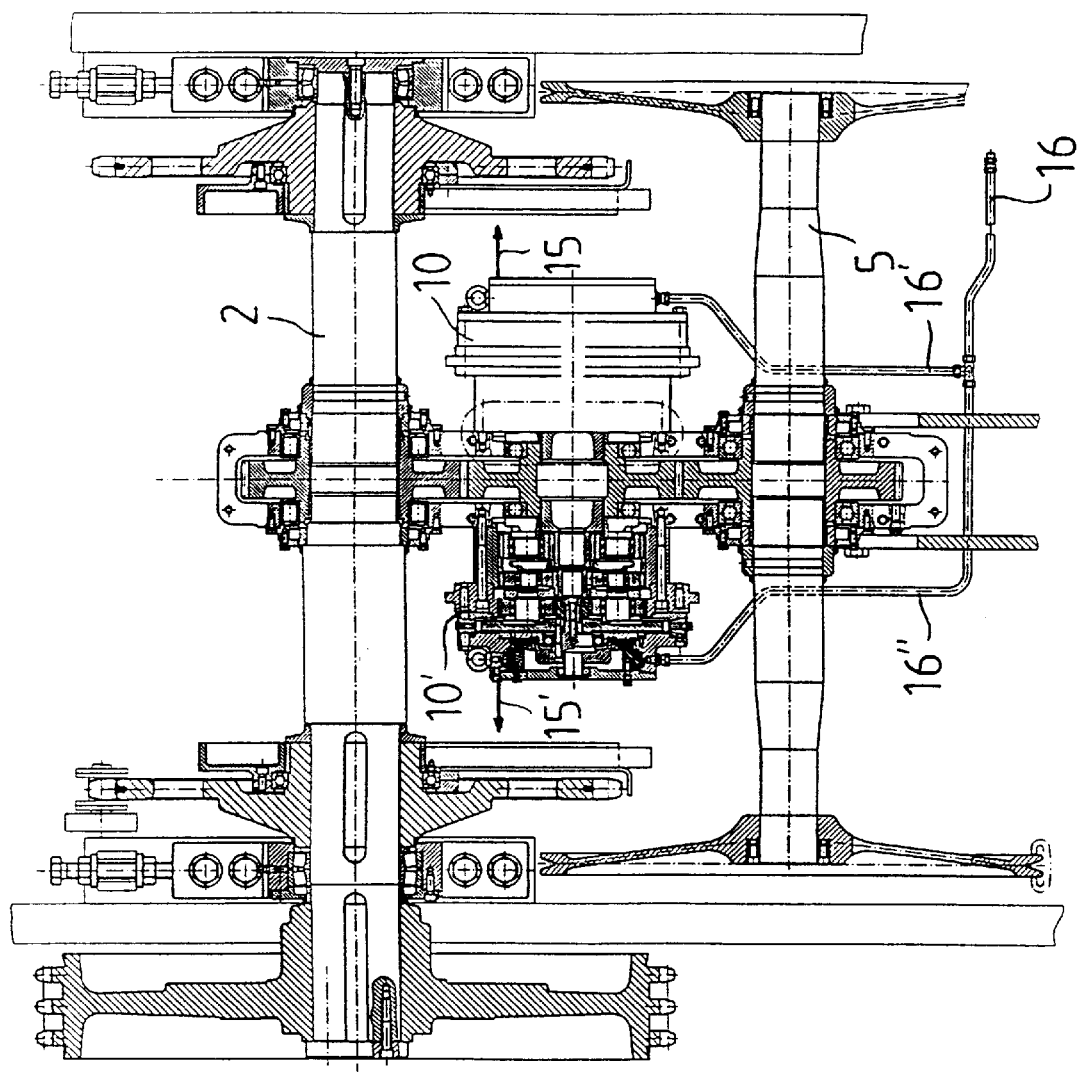
FIG. 2 is a detail of a drive means for an escalator including a double-ended gearing assembly each incorporating a safety means.

Referring now to FIG. 2 there is illustrated the design of the structure analagous to that as shown in FIG. 1, but with the difference that provided between the main drive shaft 2 and the shaft 5 are two gearings 10, 10' likewise configured in this case as planetary gears, each of which includes a hydraulic conduit 16', 16" resp. translating into a common hydraulic conduit 16 connecting the control means 14 (not shown). Analogously, cables 15, 15' are provided which likewise connect the control means (not shown).

Figure 4:
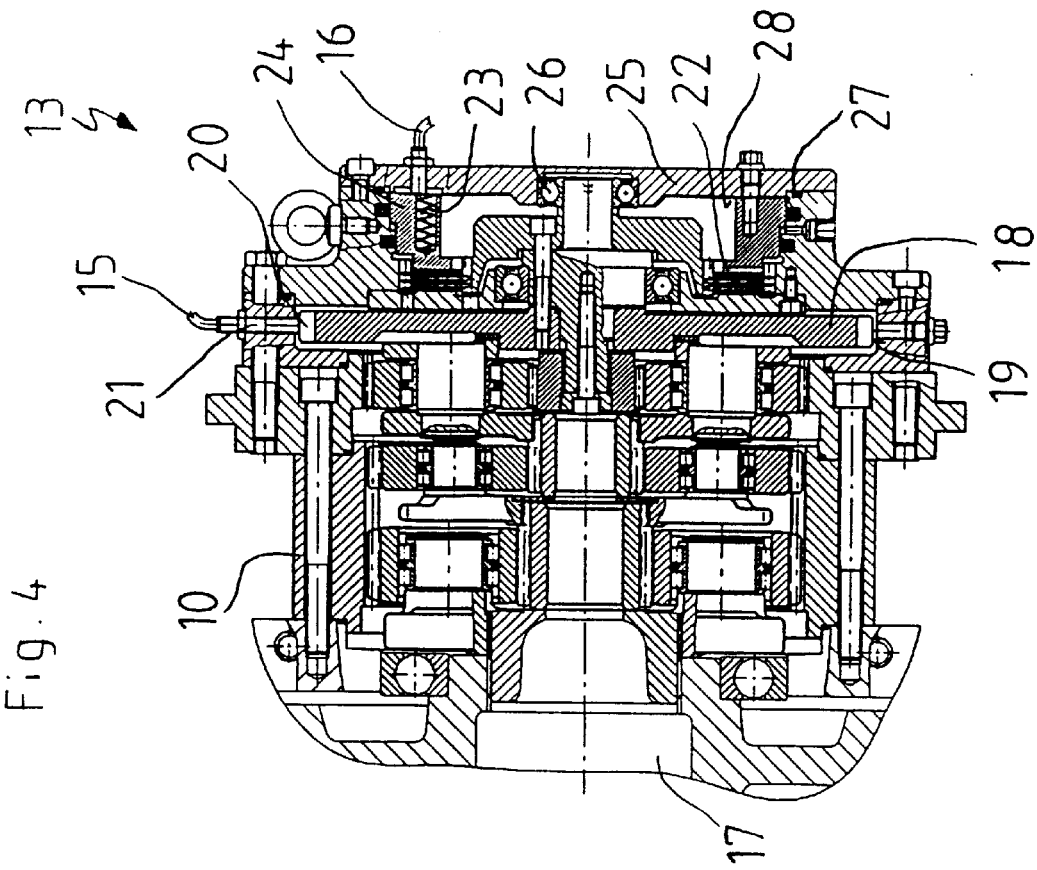
FIGS. 3 and 4 are various views of the detail of the gearing as shown in FIG. 1 in conjunction with the cited safety means.
Figure 3:
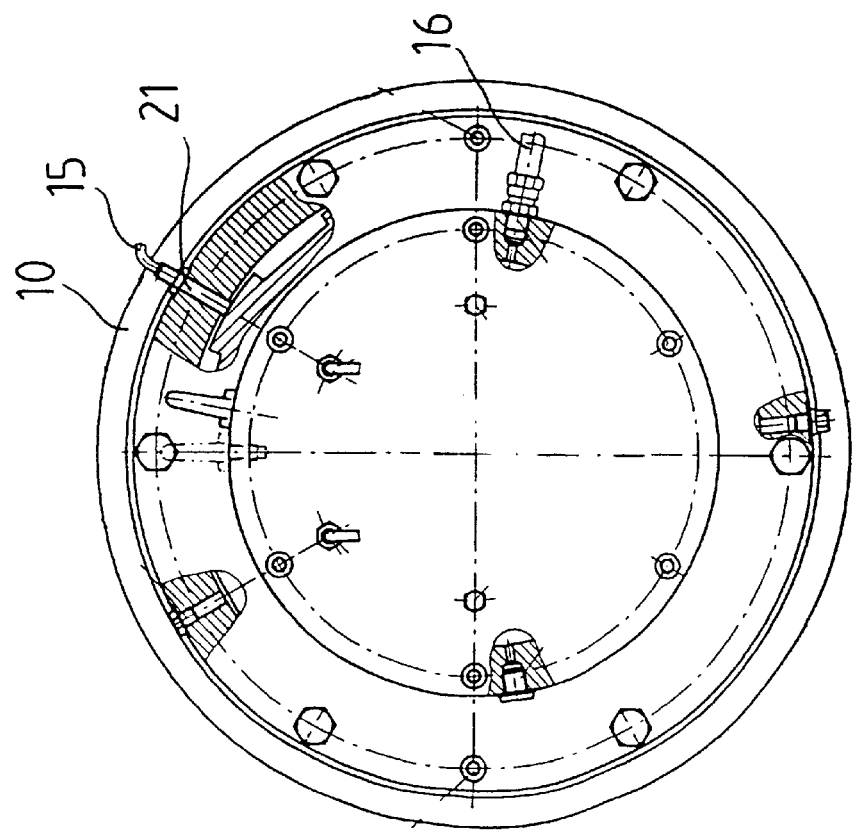

Referring now to FIGS. 3 and 4, there is illustrated the planetary gear 10 in a view on a magnified scale. It is now evident that the safety means 13 contains a flyweight element 18 cooperating with the gear shaft 17. The flyweight element 18 is dimensioned so that it compensates substantially only the friction factors (moving components) occurring in the region of the escalator. At its outer circumference 19 this disc-shaped flyweight element 18 is provided with protuberances 20. Provided in the region of the outer circumferential surface area of the flyweight element 18 at the gear casing end is an rpm sensor 21 communicating via the cable 15 with the control means (not shown here but evident from FIG. 1 as reference numeral 14). Provided external to the flyweight element is a multiplate brake 22 which is likewise connected to the control means 14 as shown in FIG. 1 via a hydraulic conduit 16. The hydraulic fluid supplied via the hydraulic conduit 16 activates a piston 24 spring-loaded by a spring 23. When the escalator is OFF the spring force of the spring 23 is so great that it maintains the multiplate brake 22 engaged. For the ON condition the multiplate brake 22 is opened via the hydraulic fluid, this condition too being maintained. Should the hydraulic flow suddenly collapse, the spring element 23 automatically results in the multiplate brake 22 closing, unless other safety means have been provided in the form of capacitors, batteries or the like to prevent this undesirable abrupt engagement of the brake.

The functioning of the safety means 13 will now be explained in detail:

Via the rpm sensor 21 the rotary speed of the flyweight element 18 is sensed repeatedly, preferably 8–15 times per second, and communicated via the cable 15 to the control means 14 which processes this signal and compares it to a predetermined design value. Normally, this electrically signal is then interpreted hydraulically so that via the hydraulic fluid the multiplate brake 22 is maintained open. Moments of force dangerous to the escalator result, among other things, from breakage of moving components such as chains or the like, as a result of which the rpm of the main drive shaft 2 and thus also the rpm of the flyweight element 18 increases. This increase in rpm is sensed by the sensor 21 and communicated to the control means 14 which then "sees" the departure from the design value. Via the hydraulic fluid communicated in the conduit 16 a condition is created which results in load-independent, soft engagement of the multiplate brake 22 within a given period of time. For example, via the time factor of 3 secs. for a given frequency of 300 Hz and a travelling speed of 0.5 m/second soft braking of the escalator is possible to practically eliminate any danger to man and machine. This system is fully in keeping with pertinent safety regulations whilst additionally optimizing prior art by simple ways and means.

The planetary gear 10 is sealed off from the environment by a cover 25 cooperating via a roller bearing 26 with the gear shaft 17. Since no rotary component is involved in this region, a rotary static seal 27 may be provided accordingly in the region of the cover 25 to reliably prevent any fluid leakage from the interior of the gear unit 28 to advantage.

What is claimed is:

1. A passenger conveyor system comprising:
    a main drive shaft on which return elements for transport chains of steps or pallets of the passenger conveyor system are mounted;
    a further shaft containing return elements for a handrail of the passenger conveyor system;
    at least one gear connecting said main drive shaft to said further shaft wherein drive power of at least one drive unit arranged external to said return elements is translatable via transport means to said main shaft; and
    a safety device including:
        at least one flyweight element provided at an end of the one at least one gear, said at least one flyweight element being disc-shaped and cooperating with the shaft of said one at least one gear;
        at least one brake means arranged on the shaft of said one at least one gear;
        at least one movement/rpm sensor; and
        at least one control means actuating said brake means, said control means being connected to the at least one movement/rpm sensor wherein load-independent braking of said main drive shaft is achievable by said brake means on the basis of signals received from said sensor and wherein said flyweight element is dimensioned so that it substantially compensates for losses due to friction as a result of moving components within said passenger conveyor system.

2. The passenger conveyor system as set forth in claim 1, wherein said sensor is an rpm sensor and is arranged to advantage in a region of the outer circumference of said flyweight element.

3. The passenger conveyor system as set forth in claim 1, wherein said brake means is a spring-loaded muliplate brake, the plates of which are actuated in an OFF condition of said passenger conveyor system by said spring elements and in an ON condition of said passenger conveyor system by hydraulically venting via said control means.

4. The passenger conveyor system as set forth in claim 3, wherein the control means is an electrohydraulic control means which finishes electrically rpm values sensed by said sensor indicating a rotary speed of the flyweight element and activates said plates of said brake means as a function of the rotary speed via at least one piston by means of hydraulic fluid.

5. The passenger conveyor system as set forth in claim 4, wherein sensing said rotary speed of said flyweight element is done 8 to 15 times a second.

6. The passenger conveyor system as set forth in claim 1, wherein said brake means is provided alongside a rotational portion of said flyweight element and the one at least one gear and flyweight element are closed off from the environment by a statically sealed non-rotatable cover.

7. The passenger conveyor system as set forth in claim 1, wherein in lengthy travelators or escalators overcoming several floors, several gear units are provided between said main drive shaft and said further shaft cooperating with safety components formed by a corresponding flyweight element, sensor and brake means, actuation of said brake means being affected via a single control means.

8. The passenger conveyor system as set forth in claim 1, wherein said control means hydraulically cooperates with said brake means.

9. The passenger conveyor system as set forth in claim 1, wherein said brake means acts on said flyweight element (18) or some other component at the output of said gearing.

10. A safety means for a passenger conveyor system including a main drive shaft mounting return elements for transport chains of the steps or pallets of the passenger conveyor system, a further shaft containing return elements for the handrails, and at least one gear connecting said main drive shaft to said further shaft, wherein the drive power of at least one drive unit arranged external to said return elements is translatable via transport means to said main drive shaft, the safety device comprising:

a spring-loaded multiplate brake, the plates of which are actuated to an OFF condition of said passenger conveyor system by spring elements and in an ON condition of said passenger conveyor system by hydraulically venting via control means;

at least one movement/rpm sensor;

at least one control means actuating said multiplate brake means, said control means being connected to the at least one movement/rpm sensor wherein load-independent braking of said main drive shaft is achievable by said multiplate brake on the basis of signals received from said sensor; and at least one flywheel element provided at an end of the one at least one gear.

11. The safety means as set forth in claim 10, wherein the control means is an electrohydraulic control means that electrically furnishes rpm values sensed by said sensor indicating a rotary speed of the flyweight element and activates said plates of said multiplate brake as a function of the rotary speed via at least one piston by means of hydraulic fluid.

12. The safety means as set forth in claim 11, wherein sensing said rotary speed of said flyweight element is done 8 to 15 times a second.

\* \* \* \* \*